(12) United States Patent
Liu et al.

(10) Patent No.: US 9,497,468 B2
(45) Date of Patent: Nov. 15, 2016

(54) BLUR MEASUREMENT IN A BLOCK-BASED COMPRESSED IMAGE

(75) Inventors: De Bing Liu, Beijing (CN); Zhi Bo Chen, Beijing (CN); Xiao Dong Gu, Beijing (CN); Feng Xu, Beijing (CN)

(73) Assignee: Thomson Licensing, Issy-les-Moulineaux (FR)

( * ) Notice: Subject to any disclaimer, the term of this patent is extended or adjusted under 35 U.S.C. 154(b) by 578 days.

(21) Appl. No.: 13/138,600

(22) PCT Filed: Feb. 26, 2010

(86) PCT No.: PCT/EP2010/052474
§ 371 (c)(1),
(2), (4) Date: Sep. 9, 2011

(87) PCT Pub. No.: WO2010/102913
PCT Pub. Date: Sep. 16, 2010

(65) Prior Publication Data
US 2011/0317768 A1    Dec. 29, 2011

(30) Foreign Application Priority Data

Mar. 13, 2009    (EP) ..................... 09305233

(51) Int. Cl.
*H04N 19/14*    (2014.01)
*G06T 7/00*    (2006.01)
*H04N 19/176*    (2014.01)
(Continued)

(52) U.S. Cl.
CPC ............ *H04N 19/14* (2014.11); *G06T 7/0002* (2013.01); *H04N 19/174* (2014.11); *H04N 19/176* (2014.11); *H04N 19/44* (2014.11);
(Continued)

(58) Field of Classification Search
CPC ............... H04N 19/00272; H04N 19/00278; H04N 19/0053; H04N 19/00854; H04N 19/00909; H04N 19/00945; H04N 19/00987
See application file for complete search history.

(56) References Cited

U.S. PATENT DOCUMENTS 6,782,135 B1    8/2004    Viscito et al.
7,099,518 B2    8/2006    Li et al.
(Continued)

FOREIGN PATENT DOCUMENTS

CN    1487749    4/2004
CN    1846444    10/2006
(Continued)

OTHER PUBLICATIONS

Marziliano etal: "Perceptual blur and ringing metrics: application to JPEG2000";Signal Processing, vol. 19, No. 2, Feb. 1, 2004, pp. 163-172.
(Continued)

*Primary Examiner* — Geepy Pe
(74) *Attorney, Agent, or Firm* — Myers Wolin LLC (57) ABSTRACT

Blur is one of the most important features related to video quality. Accurate estimating the blur level of a video is a great help to accurately evaluate the video quality. An improved method is provided for estimating the blur level of videos that are compressed by a block based codec, such as H.264/AVC, MPEG2, etc. According to the invention, local blur detection is based on macroblock (MB) edges, a content dependent weighting scheme is employed to decrease the influence from texture and when detecting local blur, the spreading of detection will stop at local minimum and maximum luminance positions.

15 Claims, 4 Drawing Sheets

(51) Int. Cl.
  *H04N 19/61* (2014.01)
  *H04N 19/174* (2014.01)
  *H04N 19/44* (2014.01)
  *H04N 19/86* (2014.01)

(52) U.S. Cl.
  CPC ............ *H04N 19/61* (2014.11); *H04N 19/86* (2014.11); *G06T 2207/30168* (2013.01)

(56) References Cited

U.S. PATENT DOCUMENTS

| | | | |
|---|---|---|---|
| 7,433,538 B2* | 10/2008 | Kusakabe et al. | 382/275 |
| 7,653,256 B2 | 1/2010 | Kanda | |
| RE41,909 E * | 11/2010 | Kim | 382/268 |
| 8,094,711 B2 | 1/2012 | Tourapis et al. | |
| 2003/0053708 A1* | 3/2003 | Kryukov et al. | 382/261 |
| 2004/0156559 A1 | 8/2004 | Cheng et al. | |
| 2005/0100235 A1* | 5/2005 | Kong et al. | 382/261 |
| 2006/0171467 A1* | 8/2006 | Schoner | 375/240.24 |
| 2006/0218619 A1 | 9/2006 | Dommisse | |
| 2008/0152017 A1 | 6/2008 | Vendrig et al. | |
| 2008/0175508 A1 | 7/2008 | Bando et al. | |
| 2009/0022220 A1 | 1/2009 | Vatis et al. | |

FOREIGN PATENT DOCUMENTS

| | | |
|---|---|---|
| JP | H07193766 | 7/1995 |
| JP | H10285587 | 10/1998 |
| JP | 2004056828 | 2/2004 |
| JP | 2004521580 | 7/2004 |
| JP | 2006507775 | 3/2006 |
| JP | 2006171840 | 7/2006 |
| JP | 2007501561 | 1/2007 |
| KR | 100327386 B1 | 3/2002 |
| KR | 2005096409 | 10/2005 |
| WO | WO03/005726 | 1/2003 |
| WO | WO03092306 | 11/2003 |
| WO | WO 2007/130389 | 11/2007 |

OTHER PUBLICATIONS

Yanweu Yu etal: "No-Reference Perceptual Quality Assessment of JPEG Images Using General Regression Neural Networks", Jan. 1, 2006, pp. 638-645.

Meesters etal: "blockiness in JPEG-Coded Images", Proceedings of the Inter'l Society for Optical Eng., vol. 3644, Jan. 25, 1999, pp. 245-157.

Yun-Chung Chung etal: "A non-parametric blue measure based on edge analysis for image processing applications", IEEE Conf. in Singapore, vol. 1, Dec. 1, 2004, pp. 356-360.

Search Report Dated Aug. 2, 2010.

Jang et al., "Postprocessing in Block-Based Video Coding Based on a Quantization Noise Model", IEICE Trans on Inform and Sys, vol. E88-D, No. 8, 23-24, Aug. 1, 2005, pp. 1966-1976.

Caviedes et al., "No-reference sharpness metric based on local edge kurtosis," Proc. of IEEE Int. Conf. on Image Processing, vol. 3, Sep. 2002, pp. 53-56.

Ferzli et al., "A robust image sharpness metric based on kurtosis measurement of wavelet coefficients," in Proc. of Int. Workshop on Video Processing and Quality Metrics for Consumer Electronics, Jan. 2005.

Marichal et al., "Blur determination in the compressed domain using DCT information," Proc. of IEEE Int. Conf. on Image Processing, Date of Conference Oct. 24-28, 1999, vol. 2, Sep. 1999, pp. 386-390.

Marziliano et al., "A no-reference perceptual blur metric," Proc. of IEEE Int. Conf. on Image Processing, vol. 3, Sep. 2002, pp. 57-60. (PCT WO03092306 related to this paper).

Caviedes et al., "No-reference sharpness metric based on local edge kurtosis," IEEE International Conference on Image Processing, vol. 3, Rochester, New York, USA, Sep. 22, 2002, pp. 53-56.

Marichal et al., "Blur determination in the compressed domain using DCT information," IEEE International Conference on Image Processing, Kobe, Japan, Oct. 24, 1999, vol. 2, pp. 386-390.

Marziliano et al., "A no-reference perceptual blur metric," IEEE International Conference on Image Processing, vol. 3, Rochester, New York, USA, Sep. 22, 2002, pp. 57-60.

Ferzli et al., "A robust image sharpness metric based on kurtosis measurement of wavelet coefficients," International Workshop on Video Processing and Quality Metrics for Consumer Electronics, Jan. 2005, pp. 1-5.

Ferzli et al., "A No-Reference Objective Image Sharpness Metric Based on the Notion of Just Noticeable Blur (JNB)", IEEE Transactions on Image Processing, vol. 18, No. 4, pp. 717-728, Apr. 2009.

Liu et al., "Image Partial Blur Detection and Classification", IEEE Conference on CVPR, pp. 1-8, Jun. 2008.

* cited by examiner

BLUR MEASUREMENT IN A BLOCK-BASED COMPRESSED IMAGE

This application claims the benefit, under 35 U.S.C. §365 of International Application PCT/EP2010/052474, filed Feb. 26, 2010, which was published in accordance with PCT Article 21(2) on Sep. 16, 2010 in English and which claims the benefit of European patent application No. 09305233.0, filed Mar. 13, 2009.

FIELD OF THE INVENTION

This invention relates to video/image quality measurement.

BACKGROUND

Blur is one of the most important features related to video quality. Accurately estimating the blur level of a video is a great help to accurately evaluate the video quality. However, the perceptual blur level is influenced by many factors such as texture, luminance, etc. Moreover, the blur generated by compression is much different from the blur in the original sequences, such as out-of-focus blur and motion blur. It is difficult to accurately estimate the blur level of a video. Various methods have been proposed to solve the problem. Those methods try to estimate the blur level of a video/image from different aspects, however the performance is not satisfying, especially for different arbitrary video content. E.g. WO03092306 detects local minimum and maximum pixels closest to a current position. That is, if there are two or more neighbouring pixels with same luminance value, it uses the pixel closest to the position.

SUMMARY OF THE INVENTION

The present invention provides an improved method for estimating the blur level of videos that are compressed by a block based codec, such as H.264/AVC, MPEG2, etc.

According to one aspect of the invention, local blur detection is based on edges of video encoding units, such as macroblock (MB) edges. According to another aspect of the invention, a content dependent weighting scheme is employed to decrease the influence from texture. According to a further aspect, when detecting local blur, the spreading of detection stops at local minimum and maximum luminance positions.

In one aspect of the invention, a method for measuring blur in a video image that is encoded using block-based coding comprises steps of
selecting a video encoding unit and a position within said video encoding unit, detecting a local blur level at the edge of the selected video encoding unit in a first direction, the first direction being horizontal or vertical,
calculating a local variance in the region around the position, calculating a local blur value if the local variance is within a defined range, wherein the pixels within said region are compared with their neighbor pixels,
combining the local blur values from different video encoding units, wherein a final directional blur of the first direction is obtained,
repeating the steps of calculating a local variance, calculating local blur and combining local blur values for a second direction, the second direction being horizontal or vertical and different from the first direction, wherein a final directional blur of the second direction is obtained, and combining the final directional blur values of the first direction and the second direction, wherein a final blur value is obtained that is a blur measure for the current image.

In one embodiment, the step of calculating a local blur value comprises that the pixels with local minimum or maximum luminance intensity along the currently selected (horizontal or vertical) direction are detected, and the local blur value is determined as being the distance between the positions with local minimum and maximum luminance values.

In one aspect of the invention, an apparatus for measuring blur in a video image that is encoded/decoded using block-based coding comprises
first selection module for selecting horizontal or vertical direction,
second selection module for selecting a video encoding unit and a position within said video encoding unit;
detection module for detecting the local blur level at the edge of the selected video encoding unit in the selected direction, the detection module comprising
  first calculation module for calculating a local variance in the region around the position according to the selected direction, and
  second calculation module for calculating the local blur, if the local variance is within a defined range, wherein the pixels within said region are compared with their neighbour pixels in the selected direction,
first combining module for combining the local blur values of the selected direction, wherein a final directional blur value of the selected direction is obtained, and
second combining module for combining the final horizontal blur value and the final vertical blur value, wherein a final blur value is obtained that is a blur measure for the current image.

In one embodiment, the second calculation module for calculating a local blur value comprises detection means for detecting pixels with local minimum or maximum luminance intensity along the currently selected (horizontal or vertical) direction, and the second calculation module calculates the local blur value as being the distance between the positions with local minimum and maximum luminance values.

In one embodiment, if the local minimum and/or maximum luminance position has two or more adjacent pixels that have equal luminance values, the pixel farthest from the current position is used as detection edge. That is, at the detection edge, all pixels that have the same luminance value are included in the blur detection.

Further objects, features and advantages of the invention will become apparent from a consideration of the following description and the appended claims when taken in connection with the accompanying drawings.

BRIEF DESCRIPTION OF THE DRAWINGS

Exemplary embodiments of the invention are described with reference to the accompanying drawings, which show in
  FIG. 1 a flow chart of vertical blur calculation.

DETAILED DESCRIPTION OF THE INVENTION

Figure 1:
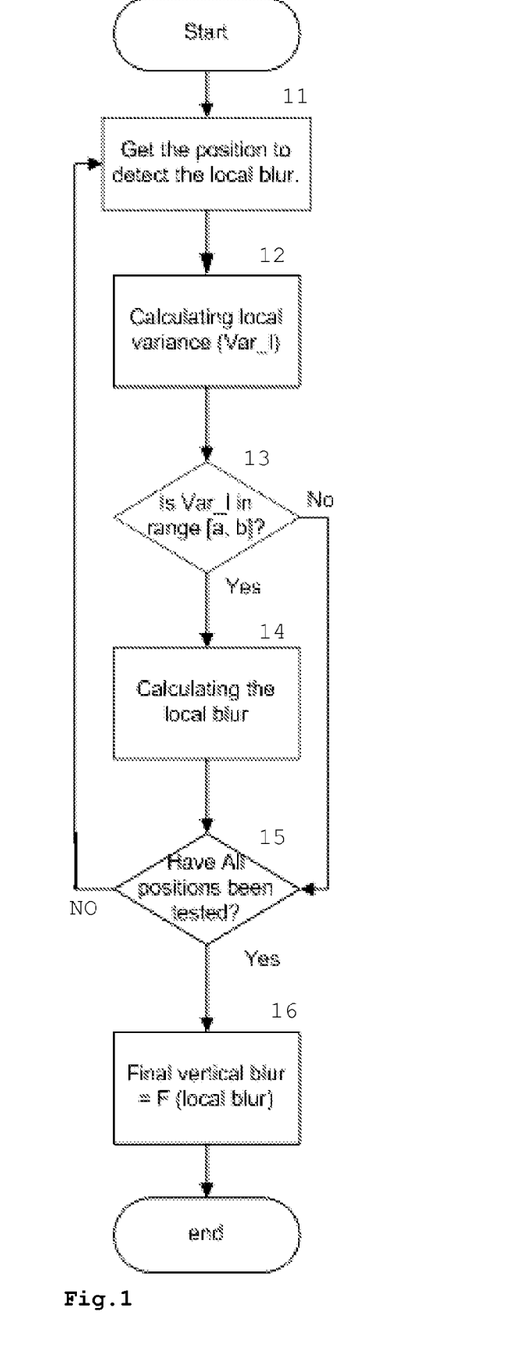

FIG. 1 shows an exemplary flow chart of vertical blur calculation. An initial step of selecting a video encoding unit and a position within said video encoding unit has been done before. In a first step 11, a position for vertical blur detection is selected. The position may depend on a predefined scheme, but may also include all macroblocks of an image. In the next step 12, the local variance var_l at the selected position is calculated, as described below. In a determining step 13 it is determined whether or not the local variance var_l is within a defined range [a,b]. If the local variance is within a defined range [a,b], the local blur is calculated 14 as described below. Otherwise, if the local variance is outside the defined range [a,b], the next step is determining 15 whether all positions have been tested. If not all positions have been tested, the next position for vertical blur detection is selected 11. Otherwise, if all positions have been tested, the final vertical blur is calculated 16. The final vertical blur is a function F(local blur) of the local vertical blur. The previously calculated local vertical blur values have been stored or selectively accumulated for this purpose.

The vertical blur, according to one aspect of the invention, is then combined with horizontal blur, which is calculated in horizontal direction using in principle the same method as described above for vertical blur.

Various aspects of the invention are described in the following.

One aspect of the invention is that local blur detection is performed on block/MB edges, while in known solutions the local blur level is detected at the texture edge. However, this would require texture analysis, ie. image analysis. The inventors have proven that for the videos compressed by a block based coding scheme, detecting the local blur level at the MB edge is more stable and effective than at the texture edge. Related experiments have been done for H.264/AVC compressed content.

Another aspect of the invention is that a content dependent weighting scheme is used in order to decrease the influence from texture. This aspect is important because local blur calculation is influenced by the texture. Without the content dependent weighting scheme, the image texture would be more disturbing to the local blur calculation. If the texture is too complicated or too plain, the calculated local blur is not stable. The content dependent weighting scheme comprises determining whether or not local blur calculation should be performed at a currently selected block/MB position. It can be implemented by calculating or estimating a local variance at the selected position, as described below. The local variance can be calculated in a classical way or estimated in a simplified way.

Figure 3:
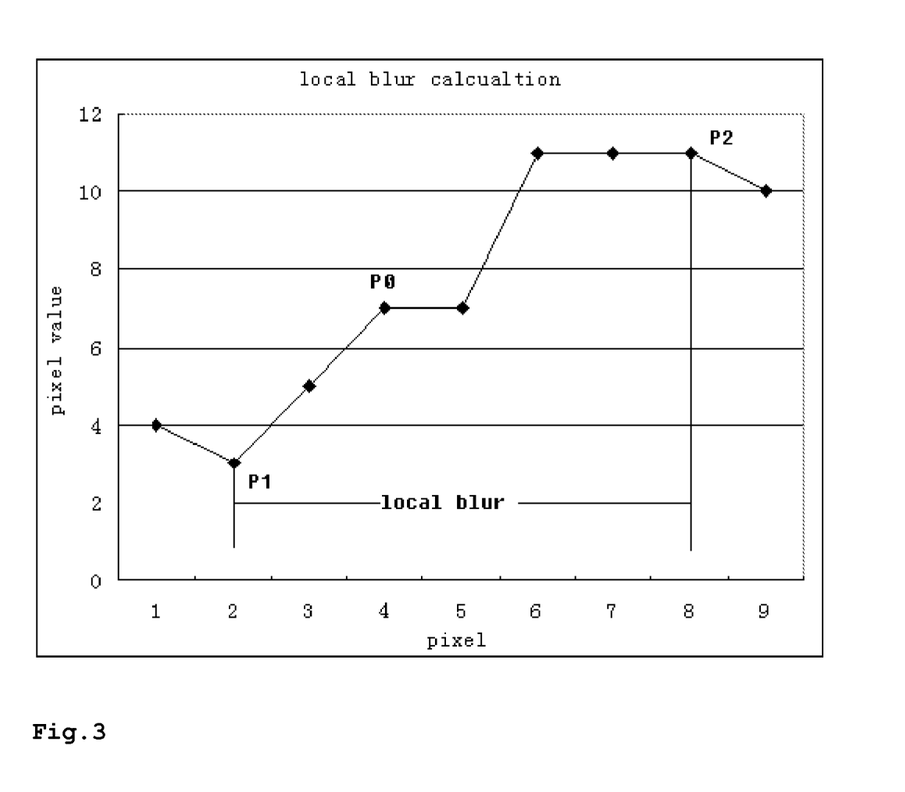
FIG. 3 detection of pixels with local minimum and maximum luminance.

Another aspect of the invention is that when detecting the local blur level using classical variance calculation, pixels that have same luminance value are included in the variance calculation. That is, the definition of "local minimum" or "local maximum" of luminance is different from previous solutions. In the present invention, e.g. a local maximum in horizontal direction is defined as: all horizontally adjacent pixels that have the same luminance value, which is higher than the luminance value of further horizontally adjacent pixels. FIG. 3 shows an example where pixels at positions 6,7,8 are considered together as a local maximum. This is advantageous because quantization in H.264 makes the pixels within MBs tend to have the same pixel value. From the experience of subjective assessment, it has been found that for any particular video content the blur level of the video is also increased as the quantization parameter (QP) is increased. This invention point is very important to keep the monotonic property between QP and blur level. A corresponding definition is used for a local minimum.

Specific embodiments and their advantages are shown below. The blur detection of a picture can be conducted in vertical and horizontal directions. FIG. 1 shows exemplarily the flow chart of vertical blur detection using classical variance calculation. It contains the following steps:

In a first step 11, get a position to detect the local blur. Known solutions detect the local blur level at the texture edge. The inventors have found that for the videos compressed by a block based coding scheme, detecting the local blur level at the MB edge is more stable and effective than at texture edges.

Figure 2:
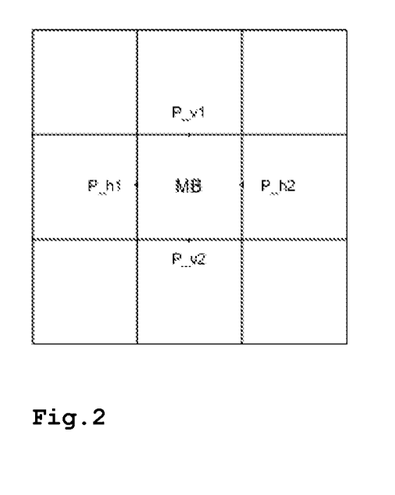
FIG. 2 a position for calculating the local blur.

To calculate the local vertical blur, the position is set at the centre of a MBs vertical edge, as shown in FIG. 2. P_v1 and P_v2 are the vertical edge centres of the MB, and P_h1 and P_h2 are the horizontal edge centres. They are the positions for calculating the local horizontal blur. In one embodiment, P_v1 or P_v2 are the positions to start the detection.

The second step is calculating the local variance (var_l) in the region around the position previously set. One embodiment that is described in the following uses the "classical" variance $\sigma^2$. The selection of the region may be a little different for videos (or images respectively) with different texture or different resolution. In one embodiment, a cross area with length equal to 15 centred at the set position is selected. However, the region may be selected a little different, e.g. 16×16 or 15×20 rectangle, cross area with length of about 20, or similar. Also, note that in all cases described herein the cross may be not exactly centered, due to the lengths of its axes; exact centering is only possible for odd numbers of pixels. The local variance is used to determine the complexity of the local texture. Generally, the texture in a picture changes continuously. Often the texture is similar in a large region, e.g. 100×100 pixels. Therefore, the variance of a 15×15 or a 15×20 region won't differ very much in such case. If the region is too small (e.g. 4×4, or 8×1) or too large (e.g. 200×200), the final result may be influenced very much. A cross area with a length of about 15 is preferable for the present embodiment.

A third step is judging if the local variance is in a given range. It has been found that if the local variance is too high or too low, the texture of the region will be too complicated or too plain, which results in an unstable local blur calculation. Therefore, if the local variance is out of the range, the local blur value will not be used for the final blur calculation, and needs not be calculated. The range of [a,b] may be different in different scenarios. The same range can be used for the whole image, and for all images. In one embodiment, it is set to [2, 20]. For most natural pictures, most (e.g. >80%) of the local variances are in this range. The range guarantees that there are enough local blur values included into the final calculation, and helps the final calculation to be stable. The inventors found that for most images, when the local variance is too low (such as <0.8) or too high (such as >40), the local blur calculation may be much influenced by the texture. The above-mentioned range of [2, 20] is strict enough to exclude those positions with too low or too high texture. For special cases, such as a picture with 90% plain space (e.g. sky), the local variance in the plain space will be out of the range, and the present embodiment of the proposed method may be less effective. For special cases, such as a picture with 90% plain space (sky), the local variance in the plain space will be out of the range. However, blur that occurs in such plain space would be less disturbing. Therefore the blur calculation can be skipped in these areas.

In a fourth step, calculate the local blur. To calculate the local vertical blur, this step detects the pixels with local minimum or maximum luminance (i.e. intensity) along the vertical direction. As FIG. 3 shows, in which P0 is the position to start the detection (corresponding to P_v1 or P_v2 in FIG. 2), P1 and P2 are the positions with local minimum and maximum luminance values, respectively. The distance between P1 and P2 is the local blur value. E.g. in FIG. 3 the distance, and thus the local blur value, is 6, namely from pixel #2 to pixel #8.

While in one embodiment the distance is calculated by simple subtraction of the pixel numbers (e.g. 8−2=6), it is in another embodiment also possible to calculate the actual number of involved pixels (e.g. from pixel #2 to pixel #8 there are 7 pixels involved). However, as long as the calculation rule is maintained, both counting methods are equivalent for the described purpose of blur calculation.

As can be seen from FIG. 3, in detecting the pixels with local minimum or maximum luminance values, where two or more adjacent pixels with same luminance value make a local minimum or maximum (such as pixels number 6-8), the pixel that is farthest from the selected position P0 is used as detection edge. This is pixel #8 instead of pixel #6.

In a fifth step, calculate the final vertical blur. All the local blurs whose related local variance var_l is in the range [a,b] are combined 16 to calculate the final vertical blur. In one embodiment, averaging of the local vertical blur values is used for calculating the final vertical blur. Similar combinations can also be used in other embodiments.

The horizontal blur can be calculated in substantially the same way as the vertical blur, except that vertical blur is calculated at horizontal edges of a MB, such as P_v1,P_v2 in FIG. 2, while horizontal blur is calculated at vertical edges (P_h1,P_h2 in FIG. 2). The final blur of the picture can be obtained by a combination of the two directional blurs, horizontal and vertical. In one embodiment, the two directional blurs are combined by averaging. There may be other combinations for special cases.

In one embodiment, an improvement for noisy images is provided. "Noisy" pixels have a very high or very low luminance value, and can therefore easily be detected. For sequences with a little noise, it may happen that such a "noisy" pixel disturbs the detection of the local minimum or maximum pixels, since the detection process will be stopped before it finds the real minimum or maximum pixel. For this kind of images, the calculated blur values are often lower than they actually should be, since the range between the local minimum and local maximum is on average too short.

Figure 5:
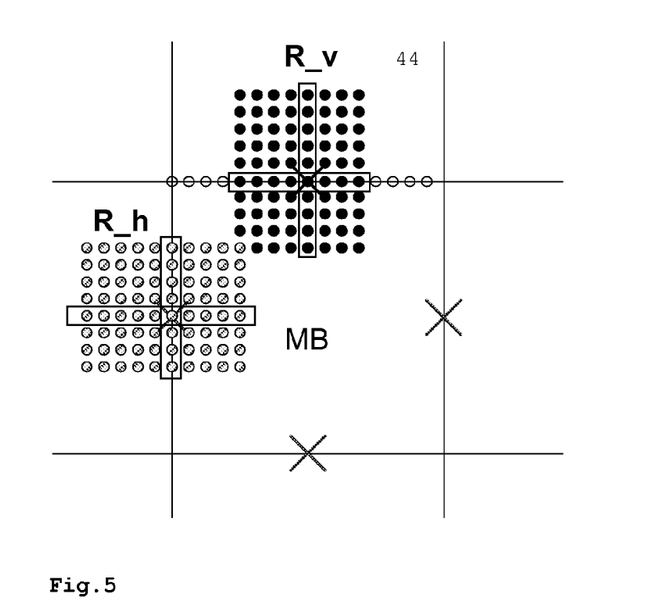
FIG. 5 cross areas used for variance calculation or simplified variance calculation.

Therefore, in one embodiment of the invention, a simplified local variance is estimated instead of calculating the more exact classical local variance $\sigma^2$. In this embodiment, the local blur is detected using all pixels of a predefined area as defined by a cross that is centred at the boundary of a MB. FIG. 5 shows an embodiment with an 8×10 block R_v for detecting vertical blur and a 10×8 block R_h for detecting horizontal blur. This embodiment comprises counting, along a direction (vertical or horizontal) in the predefined area R_v,R_h, the number of pixels whose luminance is higher than, lower than or equal to that of its neighbour pixels in a given direction. These numbers are referred to as $N_{higher}$, $N_{lower}$ and $N_{equal}$. E.g. $N_{higher}$ for local horizontal blur detection is the number of pixels that have a higher value than their left neighbour, and $N_{lower}$ for local vertical blur detection is the number of pixels that have a lower value than their upper neighbour. The sum of $N_{higher}+N_{lower}+N_{equal}$ is $N_{total}$. The local blur is calculated as in eq. (1), in which $\alpha,\beta$ are predefined parameters:

$$blur_{local} = \begin{cases} \text{No use} & N_{equal} \geq \alpha * N_{total}, \\ & \text{or } N_{equal} \leq \beta * N_{total} \\ \frac{\min\{N_{lower}, N_{higher}\}}{\max\{N_{lower}, N_{higher}\}} & \text{else} \end{cases} \quad (1)$$

The default value of $(\alpha,\beta)$ is (0.7,0.2), which is good for most images. However, in experiments the inventors found that the local blur calculation is less accurate in areas with too plain or too complicated texture. To get a more accurate result also for such areas, blocks with too plain or too complicated texture are excluded in one embodiment. In this embodiment, these blocks are detected by determining that the local blur detection results in $N_{equal} \geq \alpha*N_{total}$ or $N_{equal} \leq \beta*N_{total}$.

For some special images this limitation may result in that many blocks are outside the range and will be skipped, while only a few blocks will be selected. This would make the final blur calculation unstable. Therefore, for images with too many plain blocks (e.g. more than 50% of the blocks not usable according to eq.1), $\alpha$ can be set a little higher, such as 0.8 or 0.9; for the images with too many complicated blocks, $\beta$ can be set a little lower, such as 0.1 or 0. Thus, $\alpha,\beta$ are configurable parameters. They can be used to adjust the algorithm, e.g. after it has been determined that blur calculation can only be done at too few points. $\alpha,\beta$ can be set automatically, or upon user interaction, e.g. through a user interface. The case $N_{equal} \geq \alpha*N_{total}$ or $N_{equal} \leq \beta*N_{total}$ means that the related blocks are in too plain or too complicated texture. It is the criteria for block selection.

Advantages of this embodiment of the invention (i.e. the estimation of a simplified variance) are that it is more robust to noise, and that it is less complex. For most sequences, this embodiment has similar performance as the previously described embodiment using the exact variance, but for some special sequences with a little noise, it has better performance. Other than the previously described embodiment, this embodiment does not need to calculate the complete local variance. It uses a simplified local variance according to $N_{equal} \geq \alpha*N_{total}$ or $N_{equal} \leq \beta*N_{total}$ (with $N_{total}=N_{higher}+N_{lower}+N_{equal}$) as an indication of areas with too plain or too complicated texture.

Figure 4:
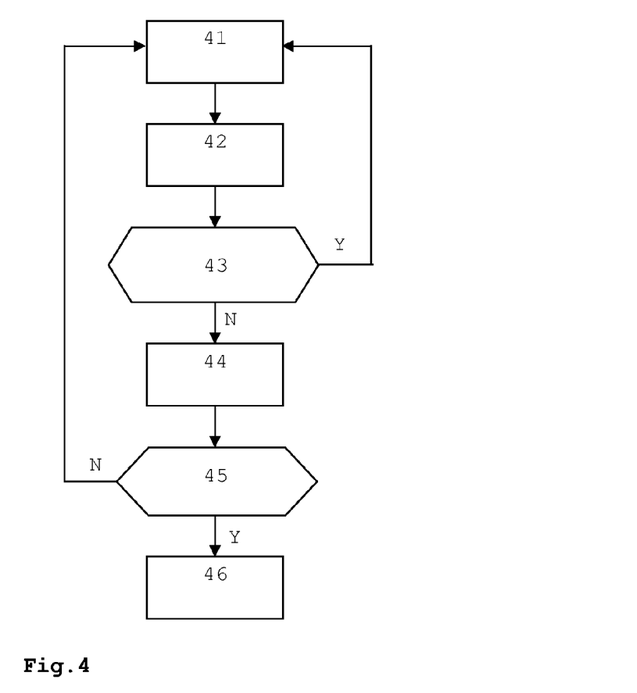
FIG. 4 a flow chart of vertical blur calculation using simplified variance calculation.

A flow chart of an embodiment that uses a simplified local variance is shown in FIG. 4.

Block 41 is to get the next position, as in block 11 of FIG. 1. As shown in FIG. 5, the black 8×10 block R_v is the region for local vertical blur calculation; it is defined by a cross that is centred at the selected position. Likewise, an 10×8 pixel block R_h is the region for local horizontal blur calculation.

Block 42 is for counting $N_{higher}$, $N_{lower}$ and $N_{equal}$. For vertical blur calculation in region R_v in FIG. 5, along the vertical direction, the numbers of pixels whose luminance is higher than, lower than or equal to that of their respective upper neighbour pixel (marked as $N_{higher}$, $N_{lower}$ and $N_{equal}$, respectively) are separately counted. For horizontal blur, in region R_h along the horizontal direction, the number of pixels whose luminance is higher than, lower than or equal to that of their left neighbour pixel (marked as $N_{higher}$, $N_{lower}$ and $N_{equal}$, respectively) are separately counted.

Figure 6:
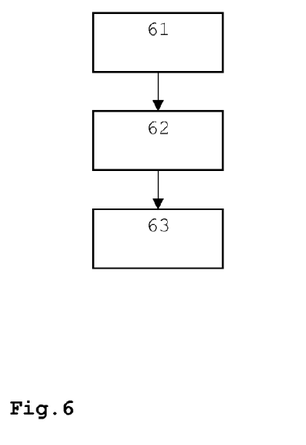
FIG. 6 a flow chart for final blur calculation.

Block 43 is for judging if $N_{equal}$ is in a defined limited range, wherein eq. (1) is used. If $N_{equal}$ is in a defined limited range, the local blur is calculated 44. Otherwise, the macroblock is skipped and the next block is selected 41. Block 45 determines if all positions have been tested, like block 15 of FIG. 1. Block 46 calculates the total vertical blur as being the average of the local vertical blurs. FIG. 6 is flow chart for final blur calculation. It shows a vertical blur calculation block 61 for calculating vertical blur (blur_v), a horizontal blur calculation block 62 for calculating horizontal blur (blur_h), and a directional blur combining block 63 for combining vertical blur and horizontal blur. The final blur is a function F(blur_v,blur_h) of both directional blurs.

Figure 7:
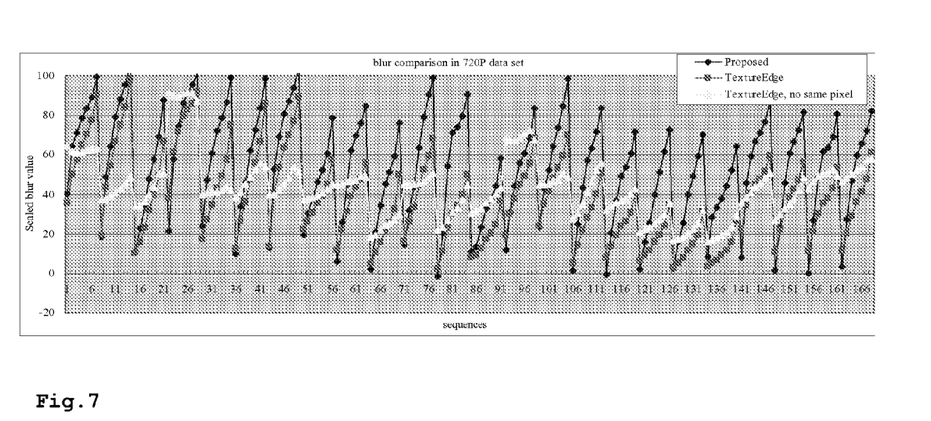
FIG. 7 exemplary blur comparison in a 720P data set.

The following results have been obtained from experiments: The proposed blur detection algorithm was tested in data sets of 720P (24 original sequences), 720×576 (9 original sequences), and 720×480 (23 original sequences). In all the data sets, each original sequence is encoded to 6 distorted sequences with QP=24, 29, 34, 37, 40 and 45. The coding software is JM10.1 (main profile with default deblocking filter). Experiments show that the proposed solution shows good performance in all three data sets. FIG. 7 shows the test result in data set 720P in which every seven points are from the same video content. The only difference between them is the QP. From FIG. 7, the following advantageous effects of the invention can be seen:

First, the calculated blur value has good monotony with the QP. From the experience of subjective assessment for the same video content, its perceptual blur level is increased as the QP is increased. There is a good monotonic property between the QP and perceptual blur level. Since the calculated blur value should match the perceptual blur level, it should also have good monotony with QP. The proposed method shows good performance in this aspect.

Second, the calculated blur value is less influenced by video content than conventionally calculated blur values.

Generally, the invention provides at least the following advantages:

The calculated blur value has good monotony with the QP. Further, also the perceptual blur has good monotony with the QP. Therefore, we may use the monotony between the calculated blur and the QP to evaluate the performance of a blur detection algorithm. The proposed method shows better performance in this aspect than other, known solutions.

The calculated blur value is less influenced by video content. The calculated blur value has high correlation with a subjective Mean Opinion Score (MOS) as obtained through subjective quality assessment.

In an experiment, we randomly selected 1176 frames (7 groups with 168 frames in each group) from the 720P sequences and then gave a subjective score for every frame. Pearson correlation between the subjective score and the calculated blur value is 0.8. In previously known solutions the Pearson correlation is about 0.4, and therefore worse.

The blur value can be used for assessing video quality by measurement, even if there is no reference image available. Therefore the video quality measurement can be done e.g. at a broadcast receiver. Advantageously only a conventional video/image is required with no additional information.

According to one aspect of the invention, a method for measuring blur in a video image that is encoded/decoded using block-based coding comprises steps of selecting a video encoding unit and a position within said video encoding unit, detecting the local blur level at the edge of the selected video encoding unit in horizontal direction, wherein a local variance is calculated in the region around the position, and if the local variance is within a defined range, a local blur value is calculated, wherein the pixels within said region are compared with their neighbour pixels in the selected direction, combining the local blur values of the video image, wherein a final horizontal blur is obtained, repeating the steps of calculating a local variance, calculating local blur and combining local blur values for the vertical direction, wherein a final vertical blur is obtained, and combining the final horizontal blur value and the final vertical blur value, wherein a final blur value is obtained that is a blur measure for the current image.

According to one aspect of the invention, an apparatus for measuring blur in a video image that is encoded using block-based coding comprises selection means for selecting a position within a video encoding unit, such as one or more macroblocks;

detection means for detecting the local blur level at the edge of the selected video encoding unit in horizontal direction;

first calculator means for calculating a local variance in the region around the position;

determining means for determining whether the local variance is within a defined range;

second calculator means for calculating the local blur, if the local variance is within said defined range, wherein the pixels with local minimum or maximum luminance intensity along the horizontal direction are detected and the distance between the positions with local minimum and maximum luminance values is the horizontal local blur value;

combining means for combining the local blur values, wherein a final horizontal blur value is obtained;

corresponding means for the vertical direction, wherein a final vertical blur value is obtained; and combining means for combining the final horizontal blur value and final vertical blur value, wherein a final blur value is obtained that is a blur measure for the current image.

The means for the vertical direction may in principle be identical with the respective corresponding means for the horizontal direction, if the selection means for selecting pixels for variance calculation and blur level calculation can be adapted to select either vertical or horizontal lines of pixels.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. Although the present invention has been disclosed with regard to MBs, one skilled in the art would recognize that the method and devices described herein may be applied to other video encoding units, e.g. blocks or super-MBs (groups of adjacent MBs). It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention. Each feature disclosed in the description and (where appropriate) the claims and drawings may be provided independently or in any appropriate combination.

Features may, where appropriate be implemented in hardware, software, or a combination of the two.

Reference numerals appearing in the claims are by way of illustration only and shall have no limiting effect on the scope of the claims.

The invention claimed is:

1. A method for measuring blur in a video image that is encoded using block-based coding, the method comprising:
   selecting, according to a predefined scheme and independent from a content of the video image, a video encoding unit and a position within said video encoding unit, wherein the video encoding unit is at least one macroblock and wherein said position is selected along a periphery of the video encoding unit;
   detecting a local blur level at the periphery of the selected video encoding unit in a first direction, the first direction being horizontal or vertical;
   calculating a local variance in a region around the position;
   if the local variance is within a defined range of variance values, calculating a local blur value, wherein pixels within said region are compared with the pixels' neighbor pixels;
   selecting a new said position in the first direction on the periphery of the video encoding unit and, for each new said position in the first direction, repeating the operations for detecting the local blur level, calculating the local variance, and calculating the local blur level;
   combining the local blur values from the positions in the first direction, wherein a final directional blur of the first direction is obtained;
   repeating the steps of detecting the local blur level, calculating a local variance, calculating a local blur, combining local blur values, and selecting the new said position for a second direction, the second direction being horizontal or vertical and different from the first direction, wherein a final directional blur of the second direction is obtained; and
   combining the final directional blur values of the first direction and the second direction, wherein a final blur value is obtained that is a blur measure for the current image.

2. The method according to claim 1, wherein the selected position within said video encoding unit is at the vertical edge centers and the horizontal edge centers of the at least one macroblock.

3. The method according to claim 1, wherein the local variance is calculated in a cross area centered at the determined position.

4. The method according to claim 3, wherein the cross area is a rectangle.

5. The method according to claim 3, wherein the cross area is a square and has a length of about 15 pixels.

6. The method according to claim 1, wherein the calculating the local blur value of a direction comprises detecting the pixels with local minimum or maximum luminance values along the direction, wherein the distance between the positions with local minimum and maximum luminance values is the local blur value of said direction.

7. The method according to claim 6, wherein in detecting the pixels with the local minimum or maximum luminance values, two or more adjacent pixels with same luminance values are used as local minimum or maximum, and wherein the pixel farthest from the selected position is used as a detection edge.

8. The method according to claim 1, wherein the defined range of local variance is [2,20].

9. The method according to claim 1, wherein the calculating the local horizontal blur comprises comparing pixels of the region with the pixels' left neighbor pixel, determining separate sums of the pixels with luminance values equal, higher or lower than the pixels' left neighbor pixel, and calculating a simplified local variance according to $$blur_{local} = \begin{cases} \text{No use} & N_{equal} \geq \alpha * N_{total}, \\ & \text{or } N_{equal} \leq \beta * N_{total} \\ \dfrac{\min\{N_{lower}, N_{higher}\}}{\max\{N_{lower}, N_{higher}\}} & \text{else} \end{cases}$$

wherein $N_{higher}$ is the sum of pixels that have a higher luminance value than the pixels' left neighbor pixel, $N_{lower}$ is the sum of pixels that have a lower luminance value than the pixels' left neighbor pixel, $N_{equal}$ is the sum of pixels that have the same luminance value as the pixels' left neighbor pixel and $N_{total}$ is the sum of pixels with luminance values equal, higher and lower than the pixels' left neighbor pixel.

10. An apparatus for measuring blur in a video image that is encoded using block-based coding, the apparatus comprising:
   at least one hardware component;
   at least one hardware processor; and
   a non-transitory, tangible, computer-readable, storage medium tangibly embodying at least one software component, the software component, when executed on the at least one hardware processor, causing the processor to perform a method, the method comprising:
   selecting a horizontal direction or a vertical direction;
   selecting, according to a predefined scheme and independent from a content of the video image, a video encoding unit and a position within said video encoding unit, the video encoding unit being at least one macroblock and wherein said position is selected along a periphery of the video encoding unit;
   detecting a local blur level at the periphery of the selected video encoding unit in the selected direction;
   calculating a local variance in a region around the position according to the selected direction;
   calculating a local blur, if the local variance is within a defined range of variance values, wherein pixels within said region are compared with the pixels' neighbor pixels in the selected direction;
   selecting a new said position in the selected direction on the periphery of the video encoding unit and, for each new said position in the selected direction, repeating the operations for detecting the local blur level, calculating the local variance, and calculating the local blur level;
   combining the local blur values from the positions of the selected direction, wherein a final directional blur value of the selected direction is obtained;
   repeating the steps of detecting the local blur level, calculating a local variance, calculating a local blur, combining local blur values, and selecting the new said position for a second direction, the second direction being horizontal or vertical and different from the selected direction, wherein a final directional blur of the second direction is obtained; and
   combining the final directional blur value of the horizontal direction and the final directional blur value of the vertical direction, wherein a final blur value is obtained that is a blur measure for the current image.

11. The apparatus according to claim 10, wherein the second calculation comprises calculating the local blur detects the pixels with local minimum or maximum luminance values along the currently selected direction, wherein the distance between the positions with local minimum and maximum luminance values is the directional local blur value.

12. The apparatus according to claim 11, wherein in detecting the pixels with the local minimum or maximum luminance values, two or more adjacent pixels with same luminance values are used as local minimum or maximum, and wherein the pixel farthest from the selected position is used as a detection edge.

13. The apparatus according to claim 10, wherein the second calculation comprises calculating the local blur compares pixels of the region with the pixels' left neighbor pixel, determines separate sums of the pixels with luminance values equal, higher or lower than the pixels' left neighbor pixel, and calculates for calculating a simplified local variance according to $$blur_{local} = \begin{cases} \text{No use} & N_{equal} \geq \alpha * N_{total}, \text{ or } N_{equal} \leq \beta * N_{total} \\ \dfrac{\min\{N_{lower}, N_{higher}\}}{\max\{N_{lower}, N_{higher}\}} & \text{else} \end{cases}$$

wherein $N_{higher}$ is the sum of pixels that have a higher luminance value than the pixels' left neighbor pixel, $N_{lower}$ is the sum of pixels that have a lower luminance value than the pixels' left neighbor pixel, $N_{equal}$ is the sum of pixels that have the same luminance value as the pixels' left neighbor pixel and $N_{total}$ is the sum of pixels with luminance values equal, higher and lower than the pixels' left neighbor pixel.

14. The method according to claim 1, wherein the predefined scheme comprises selecting all macroblocks of the video image.

15. The apparatus according to claim 10, wherein the predefined scheme comprises selecting all macroblocks of the video image.

* * * * *